United States Patent Office 2,908,604
Patented Oct. 13, 1959

2,908,604

CYANOETHERPHOSPHOROTHIOATES

Kenneth L. Godfrey, St. Albans, and George A. Saul, Nitro, W. Va., assignors to Monsanto Chemical Company, St. Louis, Mo., a corporation of Delaware No Drawing. Application October 12, 1954
Serial No. 461,937

14 Claims. (Cl. 167—22)

The present invention relates to new phosphorothioates. More particularly the invention relates to cyanoalkylether phosphorothioates by which is meant to include thioethers as well, and to methods for their preparation. The invention further relates to new systemic insecticides.

The new compounds are represented by the general formula:

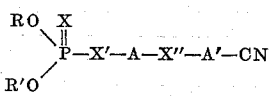

In this formula R and R' represent alkyl groups, preferably short chain alkyl groups such as methyl, ethyl, propyl, isopropyl, butyl, isobutyl and tert-butyl groups. A and A' are alkylene groups in which no more than two carbon atoms separate X' from X" and X" from the cyano group, as for example methylene, ethylene, ethylidene and methyl substituted ethylene groups. X, X' and X" represent chalkogens of atomic weight less than 40 but of X and X' at least one must be sulfur.

Phosphorothioates of the foregoing structure are extremely active insecticides and are effectively translocated by living plants. The presence of the cyano group was found to widen the spectrum of insecticidal activity providing the radical was linked through an ether or thioether group as described, otherwise mediocre insecticides result. The importance of the particular configuration defined is further illustrated by the fact that when the cyano group is replaced by halogen the systemic activity is lost. The compounds are no longer effectively translocated. Moreover, compounds in which both X and X' are oxygen are not effectively translocated. When only one of X and X' is sulfur its position is open to some question since instances of isomerism of certain phosphorothioates have been reported.

The cyanoalkylether phosphorothioates can be prepared by condensing a cynanoalkoxy- or cyanoalkylmercapto- alkyl halide with an O,O-dialkyl phosphoromono- or dithioate. Condensation with an acid phosphate ester is readily effected in the presence of sodium ethylate or an alkali metal or ammonium salt of the O,O-dialkyl phosphorothioic acid may be prepared as a separate preliminary step. For example, S-[2-(2-cyanoethylmercapto)ethyl] O,O-dimethyl phosphorodithioate results from the condensation of ammonium O,O-dimethyl phosphorodithioate and β-(2-chloroethylmercapto)propionitrile. Substituting β-(2-chloroethoxy)propionitrile in the reaction yields S-[2-(2-cyanoethoxy)ethyl] O,O-dimethyl phosphorodithioate. Another example is S-(2-cyanoethylmercaptomethyl) O,O-diethyl phosphorodithioate obtained by condensing ammonium O,O-diethyl phosphorodithioate and 2-cyanoethylmercaptomethyl chloride. The latter may be obtained by the chloromethylation of 2-mercaptopropionitrile (U.S. Patent No. 2,630,452) by the method described in Ann. 563, 62 (1949). Condensation of cyanomethyl 2-chlorethylsulfide and ammonium O,O-diethyl phosphorodithioate yields S-(2-cyanomethylmercaptoethyl) O,O-diethyl phosphorodithioate. Still further examples are S-(2-cyanomethoxyethyl) O,O-diethyl phosphorodithioate, S-[2-(1-cyanoethoxy)ethyl] O,O-diethyl phosphorodithioate, S-(2-cyanomethoxyisopropyl) O,O-diethyl phosphorodithioate obtained by reaction of 2-chloroethoxyacetonitrile, α-(2-chloroethoxy)propionitrile and 2-chloroisopropoxy acetonitrile respectively with ammonium O,O-diethyl phosphorodithioate.

Compounds in which both alkylene groups are methylene are available from di(chloromethyl)sulfide by conversion to cyanomethylmercaptomethyl chloride and condensing with a phosphorothioate. Examples are S-(cyanomethylmercaptomethyl) O,O-diethyl phosphorodithioate, S-(cyanomethylmercaptomethyl) O,O-dimethyl phosphorodithioate and S-(cyanomethylmercaptomethyl) O,O-dibutyl phosphorodithioate.

Alternatively a cyanoetheralcohol or mercaptan may be condensed with $(RO)_2POCl$ or $(RO)_2PSCl$, R having the same signfiicance as before, in the presence of a hydrogen chloride acceptor. For example, condensation of β-(2-hydroxyethylmercapto)propionitrile and O,O-dimethyl phosphorochloridothioate yields O-[2-(2-cyanoethyl)mercaptoethyl] O,O-dimethyl phosphorothioate. Other examples are O-[2-(2-cyanoethoxy)ethyl] O,O-dimethyl phosphorothioate, O-[2-(2-cyanoethoxy)ethyl] O,O-diethyl phosphorothioate and O-[2-(2-cyanoethoxy)ethyl] O,O-diisopropyl phosphorothioate.

Although the invention is not limited thereto the following examples illustrate in detail preparation of the new compounds by the methods discussed above.

EXAMPLE 1

To a mixture of 28.7 grams (0.142 mole) of a 92.5% solution of O,O-diethyl phosphorodithioate and 49.5 grams (0.142 mole) of a 19.5% solution of sodium ethylate in ethanol was added 19.0 grams (0.142 mole) of β-(2-chloroethoxy)propionitrile, B.P. 112–113.5/940 mm. (adduct of ethylene chlorohydrin and acrylonitrile, German Patent 743,224) at a temperature of 20° C. The mixture was stirred for one hour, then heated to reflux (84–85° C.) and held for ten hours. After cooling, the product was quenched with 500 cc. of water and 150 cc. of benzene added. The solution was washed with water, with a 5% sodium carbonate solution and again with water. The solvent was stripped off to 90° C. at 8 mm., then unreacted intermediate distilled over to 132° C. pot temperature at 7 mm. The S-[2-(2-cyanoethoxy)ethyl] O,O-diethyl phosphorodithioate, weighing 25.4 grams, was a tan liquid. It contained 10.6% phosphorus, 20.5% sulfur and 4.5% nitrogen as compared to calculated values for $C_9H_{18}NO_3PS_2$ of 10.9% phosphorus, 22.6% sulfur and 4.9% nitrogen.

EXAMPLE 2

As the first step of this reaction, 100 grams (0.84 mole) of thionyl chloride in 65 cc. of dry chloroform was added dropwise to 100 grams (0.763 mole) of β-(2-hydroxyethylmercapto)propionitrile (Org. Syn. 29, p. 52—1949) in 207 grams of dry chloroform. This addition resulted in evolution of heat and refluxing of the reaction mixture between 40–50° C. The heat of reaction was suplemented by heating sufficient to maintain the reaction mixture at refluxing temperature during the addition which required about an hour. The reaction mixture was then stirred without heating for four hours and allowed to stand overnight. The solids were removed by filtration and the filtrate stripped to 105° C. at 25 mm. The resulting β-(2-chloroethylmercapto)propionitrile weighed 111.6 grams which represents 97.8% theory yield of crude product. A sample distilled at 137–147° C. at 5–7 mm. with slight decomposition.

In the second step of this reaction, 101.6 grams (0.5 mole) of ammonium O,O-diethyl phosphorodithioate dissolved in 180 cc. of acetone was added all at once without cooling to 30.6 grams (0.205 mole) of distilled β-(2-chloroethylmercapto)propionitrile described in the first step. The mixture was heated with stirring to refluxing temperature (63° C.) within ten minutes and within another ten minutes there was a heavy precipitate of ammonium chloride. Refluxing was continued for ninety minutes, heating then discontinued and the product cooled. The acetone was stripped off by heating to 100° C. at atmospheric pressure and 200 ml. of water added to the residue. The organic layer was washed twice with 200 cc. portions of water and the washes extracted with chloroform. The chloroform extracts and product were combined and the solvent stripped to 100° C. at 25 mm. There was obtained 60 grams of S-[2-(2-cyanoethylmercapto)ethyl] O,O-diethyl phosphorodithioate analyzing 10.24% phosphorus, 31.0% sulfur and 4.68% nitrogen. The corresponding values for $C_9H_{18}NO_2PS_2$ are calculated as 10.35% phosphorus, 32.2% sulfur and 4.7% nitrogen.

EXAMPLE 3

To a solution of 90.0 grams (0.48 mole) of S-ammonium O,O-diethyl phosphorothioate (U.S. Patent 2,647,140) in 200 cc. of acetone was added 60.0 grams (0.4 mole) of distilled β-(2-chloroethylmercapto)propionitrile described in Example 2. The mixture was refluxed at 63–65° C. for fifteen hours during which time ammonium chloride precipitated from solution. The solvent was then stripped off to a pot temperature of 95° C. The product was cooled to 40° C., water added, the organic layer washed with a dilute sodium carbonate solution and then with water. The washes were extracted with chloroform and the extracts combined with the organic layer. The solvent was stripped off by heating to 110° C. at 25 mm. The S-[2-(2-cyanoethylmercapto)ethyl] O,O-diethyl phosphorothioate was obtained in 70.8% yield. Analysis showed 9.0% phosphorus, 21.6% sulfur and 5.56% nitrogen as compared to 10.9% phosphorus, 22.6% sulfur and 4.95% nitrogen calculated for $C_9H_{18}NO_3PS_2$. This compound maintains a residual toxicity on sprayed plants at 0.05% concentration for more than one week. It is a general toxicant affecting aphids, mites, bean beetles, tribolium and milkweed bugs.

EXAMPLE 4

To a solution of 40.4 grams (0.308 mole) of β-(2-hydroxyethylmercapto)propionitrile and 22.7 grams (0.291 mole) of pyridine in 150 ml. of benzene there was added dropwise at 15–20° C. 50 grams (0.265 mole) of O,O-diethyl phosphorochloridothioate. The mixture was stirred at 28° C. for 75 minutes and then heated at about 70° C. for sixteen hours. The product was then cooled, water added, and the organic layer washed, once with dilute sodium carbonate and once with water. The benzene was stripped off by heating to 100° C. at 25 mm. to yield 50.5 grams of O-[2-(2-cyanoethylmercapto)-ethyl] O,O-diethyl phosphorothioate. Analysis showed 11.0% phosphorus, 21.4% sulfur and 5.15% nitrogen as compared to 11.0% phosphorus, 22.6% sulfur and 5.95% nitrogen calculated for $C_9H_{18}NO_3PS_2$.

EXAMPLE 5

To a solution of 37.8 grams (0.15 mole) of potassium O,O-diisopropyl phosphorodithioate in 250 cc. of dioxane was added 17 grams (0.127 mole) of β-(2-chloroethoxy)-propionitrile and the mixture heated at refluxing temperature (104° C.) for 37½ hours with stirring. After cooling, 300 cc. of water was added and the aqueous layer extracted with 150 cc. of benzene and the benzene extract added to the organic layer. After two washes with a 5% solution of sodium carbonate and one water wash, the solvent was stripped off by heating to 125° C. at 7 mm. The S-[2-(2-cyanoethoxy)ethyl] O,O-diisopropyl phosphorodithioate, a clear yellow liquid, was obtained in 80.8% theory yield. It analyzed 3.9% nitrogen, 9.8% phosphorus and 19.75% sulfur as compared to 4.65% nitrogen, 10.0% phosphorus and 20.6% sulfur calculated for $C_{11}H_{22}NO_3PS_2$.

As illustrative of the insecticidal activity, petri dishes were sprayed with an acetone solution of the test material using approximately 20 ml. for each spraying. The open dishes were held for 24 hours, then large milkweed bug nymphs were placed on the dishes and held uncovered for 48 hours at room temperature without food and water. The results are set forth in the table below:

Table I

Percent kill at concentration of 0.1%

| | |
|---|---|
| S-[2-(2-cyanoethoxy)ethyl] O,O-diethyl phosphorodithioate | 100 |
| S-[2-(2-cyanoethylmercapto)ethyl] O,O-diethyl phosphorodithioate | 100 |
| S-[2-(2-cyanoethylmercapto)ethyl] O,O-diethyl phosphorothioate | 100 |
| O-[2-(2-cyanoethylmercapto)ethyl] O,O-diethyl phosphorothioate | 100 |
| S-[2-(2-cyanoethoxy)ethyl] O,O-diisopropyl phosphorodithioate | 100 |
| S-(2-ethoxyethyl) O,O-diethyl phosphorodithioate | 30 |

It will be noted that the absence of a cyano group in the last compound lowered the activity.

Similarly, application of the compounds as foliage sprays was likewise effective. An aqueous emulsion of the test material was applied to potted plants, some of which were infested with insects and some to which insects were later transferred. Both surfaces of the foliage were sprayed to run-off. The results are set forth in the table below:

Table II

| Two-spotted spider mite | Percent Kill at Concentration of 0.1% |
|---|---|
| S-[2-(2-Cyanoethoxy)ethyl] O,O-diethyl phosphorodithioate | 100 |
| S-[2-(2-Cyanoethylmercapto)ethyl] O,O-diethyl phosphorodithioate | 100 |
| S-[2-(2-Cyanoethylmercapto)ethyl] O,O-diethyl phosphorothioate | 100 |
| O-[2-(2-Cyanoethylmercapto)ethyl] O,O-diethyl phosphorothioate | 100 |
| S-[2-(2-Cyanoethoxy)ethyl] O,O-diisopropyl phosphorodithioate | 100 |

The cyanoether phosphorothioates are also effective systemic insecticides. Bean plants in the second leaf stage were cut and placed in 10 p.p.m. solutions of the test material for three days. The plants were then transferred to water and Mexican bean beetle larvae transferred to the plants. The toxic effect of the new compounds on insects feeding on such plants is shown in Table III.

Table III

Percent kill at concentration of 0.001%

| | |
|---|---|
| S-[2-(2-cyanoethoxy)ethyl] O,O-diethyl phosphorodithioate | [1] 100 |
| S-[2-(2-cyanoethylmercapto)ethyl] O,O-diethyl phosphorodithioate | 100 |
| S-[2-(2-cyanoethylmercapto)ethyl] O,O-diethyl phosphorothioate | 100 |
| O-[2-(2-cyanoethylmercapto)ethyl] O,O-diethyl phosphorothioate | 100 |

It is intended to cover all changes and modifications of the examples of the invention herein chosen for purposes

---

[1] Very little feeding.

of disclosure which do not constitute departures from the spirit and scope of the invention.

What is claimed is:

1. A compound of the structure

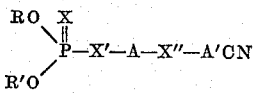

where R and R' represent short chain alkyl groups, X, X' and X" represent a chalkogen of atomic weight less than 40 but of X and X' at least one is sulfur and A and A' represent alkylene groups of not more than two carbon atoms in length.

2. An O,O-di-(lower alkyl) phosphorothioate having the remaining valence satisfied by a β-mono-cyano alkylthioalkyl group in which neither alkyl group is more than two carbon atoms in length.

3. A compound of the structure

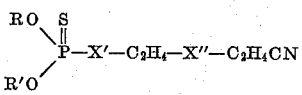

where R and R' represent short chain alkyl groups and X' and X" represent a chalkogen of atomic weight less than 40.

4. A compound of the structure

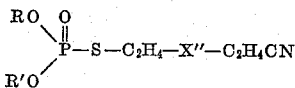

where R and R' represent short chain alkyl groups and X" represents a chalkogen of atomic weight less than 40.

5. A compound of the structure

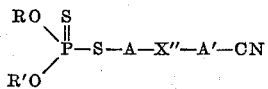

where R and R' represent short chain alkyl groups, X" represents a chalkogen of atomic weight less than 40 and A and A' represent alkylene groups not more than two carbon atoms in length.

6. The compound of the structure
   $(C_2H_5O)_2(PS)SCH_2CH_2OCH_2CH_2CN$
7. The compound of the structure
   $(C_2H_5O)_2(PS)SCH_2CH_2SCH_2CH_2CN$
8. The compound of the structure
   $(C_2H_5O)_2(PO)SCH_2CH_2SCH_2CH_2CN$
9. The compound of the structure
   $(C_2H_5O)_2(PS)OCH_2CH_2SCH_2CH_2CN$
10. The compound of the structure
    $[(CH_3)_2CHO]_2(PS)SC_2H_4OC_2H_4CN$ 11. The method which comprises condensing equal molecular proportions of a compound of the structure NC—A'—X—A—Y where A and A' represent alkylene groups not more than two carbon atoms in length, X represents a chalkogen of atomic weight less than 40 and Y is selected from a group consisting of chlorine, OH and SH with a compound of the structure

where R and R' represent lower alkyl groups, X' has the same meaning as X and Z is selected from a group consisting of chlorine, alkali metal S— and NH₄S—, one but not both of the radicals Y and Z being chlorine and at least one of the radicals X', Y and Z containing sulfur, reaction being effected by heating the aforesaid reactants in an organic solvent to form by-product chloride but below decomposition temperatures of the reactants and product.

12. The method which comprises condensing equal molecular proportions of a compound of the structure CNA'X—ACl where A and A' represent alkylene groups not more than two carbon atoms in length, X represents a chalkogen of atomic weight less than 40 with a member selected from the group consisting of alkali metal and ammonium salts of an O,O-di(lower alkyl) phosphorothioate, reaction being effected by heating the aforesaid reactants in an organic solvent at a temperature within the range of the refluxing temperature of an acetone solution and the refluxing temperature of a dioxane solution at atmospheric pressure.

13. The method which comprises condensing equal molecular proportions of a compound of the structure CNA'X"—A—OH with a compound of the structure

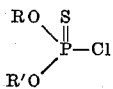

where A and A' represent alkylene groups not more than two carbon atoms in length, X" represents a chalkogen of atomic weight less than 40 and R and R' represent short chain alkyl groups, reaction being effected by heating the aforesaid reactants in an organic solvent in the presence of a hydrogen chloride acceptor at a temperature within the range of the refluxing temperature of an acetone solution and the refluxing temperature of a dioxane solution at atmospheric pressure.

14. A composition consisting essentially of an O,O-di-(lower alkyl) phosphorothioate having the remaining valence satisfied by a CNC₂H₄XC₂H₄— group where X represents a chalkogen of atomic weight less than 40, uniformly dispersed in an inert pesticidal adjuvant as carrier therefor.

No references cited.